United States Patent [19]

Taniguchi

[11] Patent Number: 5,661,720

[45] Date of Patent: Aug. 26, 1997

[54] MULTI-RING NETWORK HAVING PLURAL RINGS CONNECTED BY NODE

[75] Inventor: Takayuki Taniguchi, Kawasaki, Japan

[73] Assignee: Fujitsu Limited, Kawasaki, Japan

[21] Appl. No.: 731,117

[22] Filed: Oct. 9, 1996

Related U.S. Application Data

[63] Continuation of Ser. No. 442,139, May 16, 1995, abandoned, which is a continuation of Ser. No. 33,606, Mar. 18, 1993, abandoned.

[30] Foreign Application Priority Data

Mar. 18, 1992 [JP] Japan ................... 4-062572

[51] Int. Cl.$^6$ ................................ H04L 12/46
[52] U.S. Cl. .................. 370/223; 370/242; 370/248; 370/403; 370/465
[58] Field of Search ................... 370/223, 242, 370/248, 465, 401, 402, 403

[56] References Cited

U.S. PATENT DOCUMENTS

| | | | |
|---|---|---|---|
| 4,779,261 | 10/1988 | Yamagishi et al. | 370/16 |
| 4,835,763 | 5/1989 | Lau | 370/16 |
| 4,964,120 | 10/1990 | Mostashari | 370/16 |
| 5,103,447 | 4/1992 | Takiyasu et al. | 370/85.15 |
| 5,218,604 | 6/1993 | Sosnosky | 370/85.14 |
| 5,327,427 | 7/1994 | Sandesara | 370/85.14 |

FOREIGN PATENT DOCUMENTS

| | | | |
|---|---|---|---|
| 3-21137 | 1/1991 | Japan | H04L 12/42 |

*Primary Examiner*—Russell W. Blum
*Attorney, Agent, or Firm*—Greer, Burns & Crain, Ltd.

[57] ABSTRACT

A multi-ring network structured by connecting a plurality of rings having different speeds. The multi-ring network includes a first ring structured by connecting a plurality of first nodes by a pair of ring-formed first transmission lines, a second ring structured by connecting a plurality of second nodes by a pair of ring-formed second transmission lines, and a third node for connecting the first ring and the second ring. The first transmission line has a first transmission speed and the second transmission line has a second transmission speed lower than the first transmission speed. The third node has a demultiplexer for deriving a plurality of handling group data by time division demultiplexing data having the first transmission speed, conversion means for converting data having the second transmission speed into handling group data, a plurality of highways adapted to transmit the handling group data, and a multiplexer for time division multiplexing the handling group data and outputting the multiplex data to the first transmission line. In the third node, data are handled for each handling group data as a unit and the selected handling group data is connected to the first or second ring.

4 Claims, 12 Drawing Sheets

MULTI-RING NETWORK HAVING PLURAL RINGS CONNECTED BY NODE

This application is a continuation of application Ser. No. 08/442,139 filed on May 16, 1995 now abandoned which is a continuation of Ser. No. 08/033,606, filed Mar. 18, 1993, abandoned.

BACKGROUND OF THE INVENTION

1. Field of the Invention

The present invention relates to a multi-ring network structured by connecting a plurality of rings having different transmission speeds by nodes.

2. Description of the Related Art

In connecting subscribers' terminals to a network, a star network may be used if the subscribers' terminals are located relatively close to each other. However, when terminals are spaced relatively far apart, a ring network such as a local area network (LAN) will be effectively used. As an example of a network having such spaced apart terminals, there is an emergency telephone network run by a public institution. The telephones connected to this network are such that they are installed along a highway or the like at regular intervals. Such an emergency telephone system has a great importance sometimes relating to people's lives. Therefore, it is required to enhance the reliability on the line as much as possible and hence the line is required to be provided in a duplicative structure.

A conventional ring network in general use is shown in FIG. 1. A plurality of nodes A', B', C', and D' are connected by a transmission line 1 drawn by a solid line and a backup transmission line 2 drawn by a broken line, in which arbitrary nodes B' and C' are connected with terminals 3 and 4. Since the nodes are connected by a pair of transmission lines 1 and 2 to form a ring, the transmission line has a duplicative structure.

When, in general, communication is to be made between the terminals 3 and 4, data output from the terminal 3 is transmitted through the transmission line 1 counterclockwise to be input to the terminal 4. Data output from the terminal 4 is also transmitted through the transmission line 1 counterclockwise to be input to the terminal 3. When a line breakage occurs somewhere in the transmission line 1, the backup transmission line 2 is put into use. In this case, data is transmitted clockwise.

Referring to FIG. 2, there is shown a schematic diagram illustrating a case where communication is established between two ring networks. When the ring network 5 and the ring network 6 communicate with each other, the node 8 of the ring network 5 and the node 9 of the ring network 6 are connected by a dedicated transmission line 7.

However, when the two ring networks 5 and 6 are connected by a dedicated transmission line 7 as shown in FIG. 2, it is impossible to make the transmission line 7 duplicative. Accordingly, when trouble such as a line breakage occurs in the transmission line 7, the communication between the ring network 5 and the ring network 6 becomes interrupted. Thus, there has been a problem of low reliability on the network-to-network communication.

SUMMARY OF THE INVENTION

Accordingly, an object of the present invention is to provide a highly reliable multi-ring network structured by connecting a plurality of duplicative rings having different transmission speeds by a node.

Another object of the present invention is to provide a highly reliable ring network structured by connecting a plurality of duplicative transmission lines into a ring form by nodes.

In accordance with an aspect of the present invention, there is provided a multi-ring network which includes a first ring structured by connecting a plurality of first nodes by a pair of ring-formed first transmission lines, the first transmission lines having a first transmission speed; a second ring structured by connecting a plurality of second nodes by a pair of ring-formed second transmission lines, the second transmission lines having a second transmission speed lower than the first transmission speed; and a third node for connecting the first ring with the second ring, the third node being common to said fist ring and said second ring. The third node includes: a demultiplexer for deriving a plurality of first handling group data by time division demultiplexing first data transmitted over the first transmission line and having the first transmission speed; first means for converting second data transmitted over the second transmission line and having the second transmission speed into second handling group data with the same speed as that of the first handling group data; a plurality of highways adapted to transmit the first and second handling group data; a multiplexer for time division multiplexing the first and the second handling group data and outputting the multiplex data to the first transmission line; means for selecting first handling group data to assigned to the second transmission line; second means for converting the selected first handling group data for speed and outputting the data converted for speed to the second transmission line; and connection means for connecting the selected first handling group data to the second means and connecting the second handling group data to the multiplexer.

Each of the first, second, and third nodes has a terminal mode function for transmitting data delivered from the terminal connected to the node in both directions and selecting one of data transmitted from both the directions and outputting the selected data to the terminal. The first, second and third nodes also have a repeat or pass mode function for allowing incoming data transmitted from both the directions to pass through the node in their transmitted directions. Further, each node has mode selection means for arbitrarily selecting either the terminal mode function or the repeat mode function.

The selection of either of the terminal mode function and the repeat mode function is performed within each node for each handling group data as a unit. Thus, it becomes possible to transmit a set of handling group data to the terminal by using the terminal mode function, to transmit another set of handling group data to the second transmission line by using the repeat mode function, and to transmit the remaining set of handling group data to the first transmission line by using the repeat mode function. Since data handling within each node is performed for each handling group data as a unit, a flexible ring network can be structured.

Preferably, each node has alarm information detection means for detecting, when the terminal mode function is selected, alarm information from data transmitted from both the directions and switch means for cutting off the transmission line from which the alarm information has been sent over and outputting incoming data from the other transmission line to the terminal.

In accordance with another aspect of the present invention, there is provided a ring network including a first duplicative transmission line structured by connecting a plurality of first nodes by a pair of first transmission lines, the first transmission line having a first transmission speed; a plurality of second duplicative transmission lines each thereof being structured by connecting a plurality of second nodes by a pair of second transmission lines, the second transmission lines each having a second transmission speed lower than the first transmission speed; and a pair of third nodes connecting the first duplicative transmission line and the plurality of second duplicative transmission lines in a ring form. The third node has: a demultiplexer for deriving a plurality of first handling group data by time division demultiplexing first data transmitted over the first duplicative transmission line and having the first transmission speed; a plurality of first conversion means for converting second data transmitted over the second duplicative transmission lines and having the second transmission speed into second handling group data with the same speed as that of the first handling group data; a plurality of highways adapted to transmit the first and second handling group data; a multiplexer for time division multiplexing the second handling group data and outputting the multiplex data to the first duplicative transmission line; means for selecting first handling group data to be assigned to the respective second duplicative transmission lines; a plurality of second conversion means for converting the first handling group data for speed and outputting the data converted for speed to each of the second duplicative transmission lines; and connection means for connecting the first handling group data to the respective second conversion means and connecting the second handling group data to the multiplexer.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
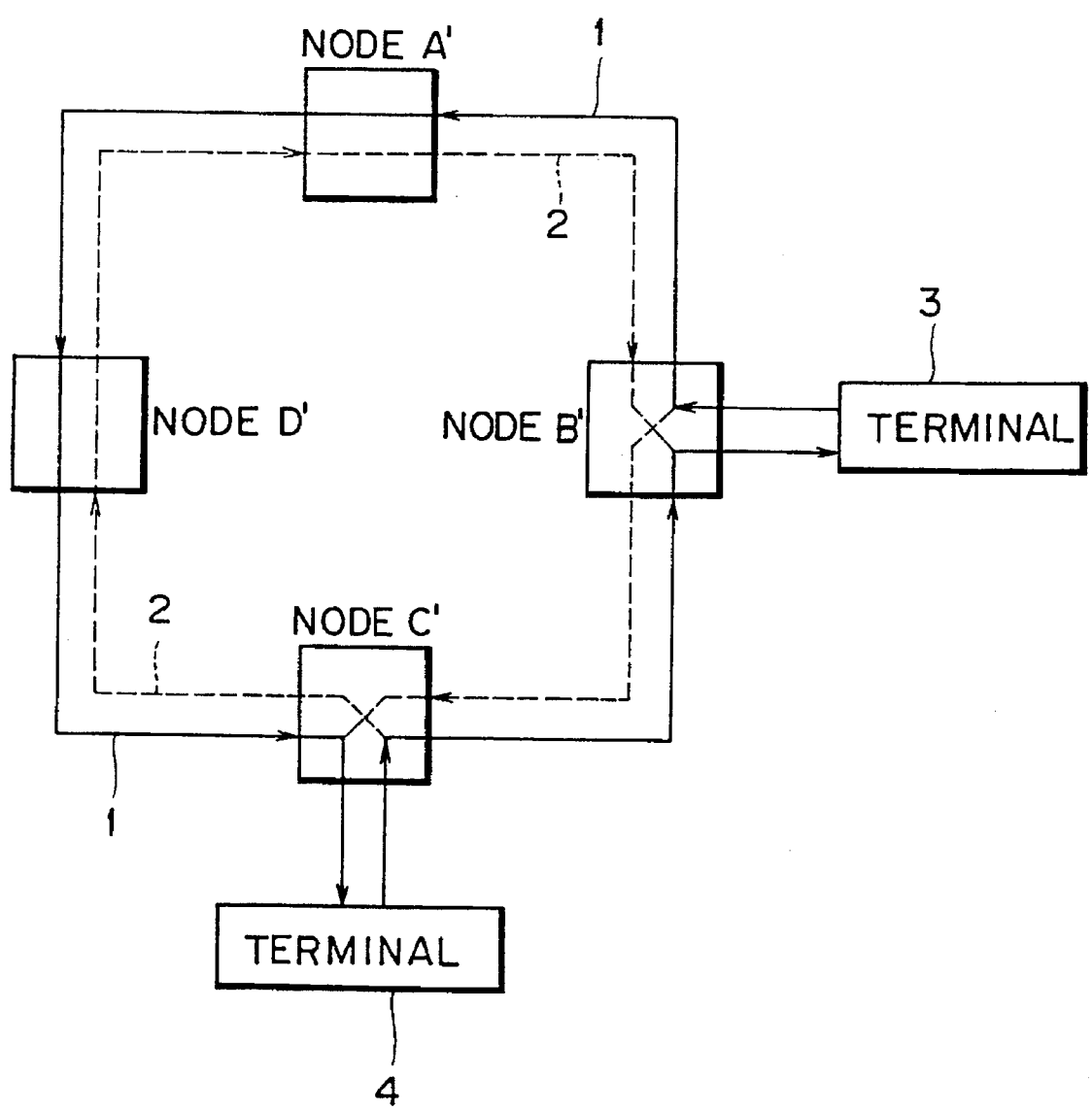
FIG. 1 is a schematic diagram showing a conventional ring network.
Figure 2:
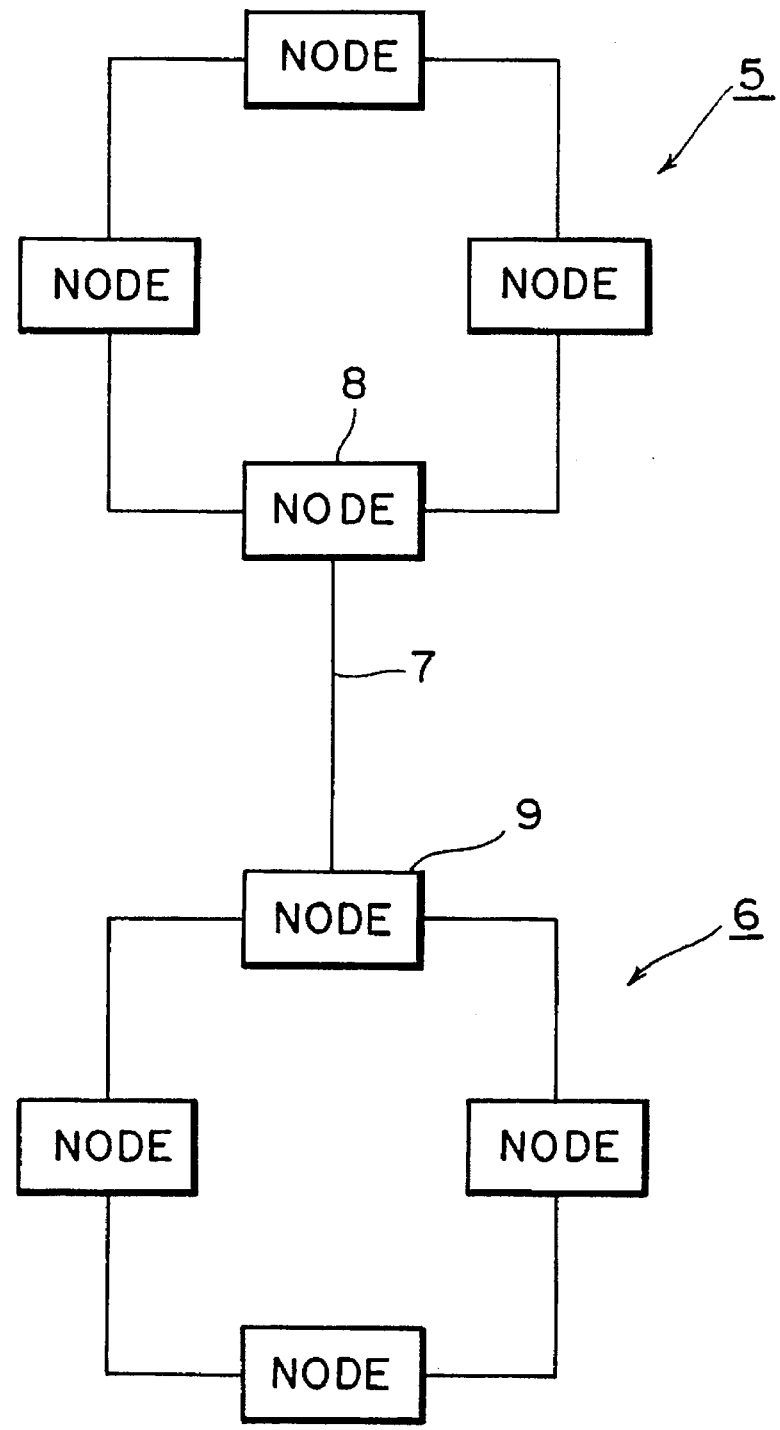
FIG. 2 is a schematic diagram showing a conventional method of connection for establishing communication between ring networks.
Figure 3:
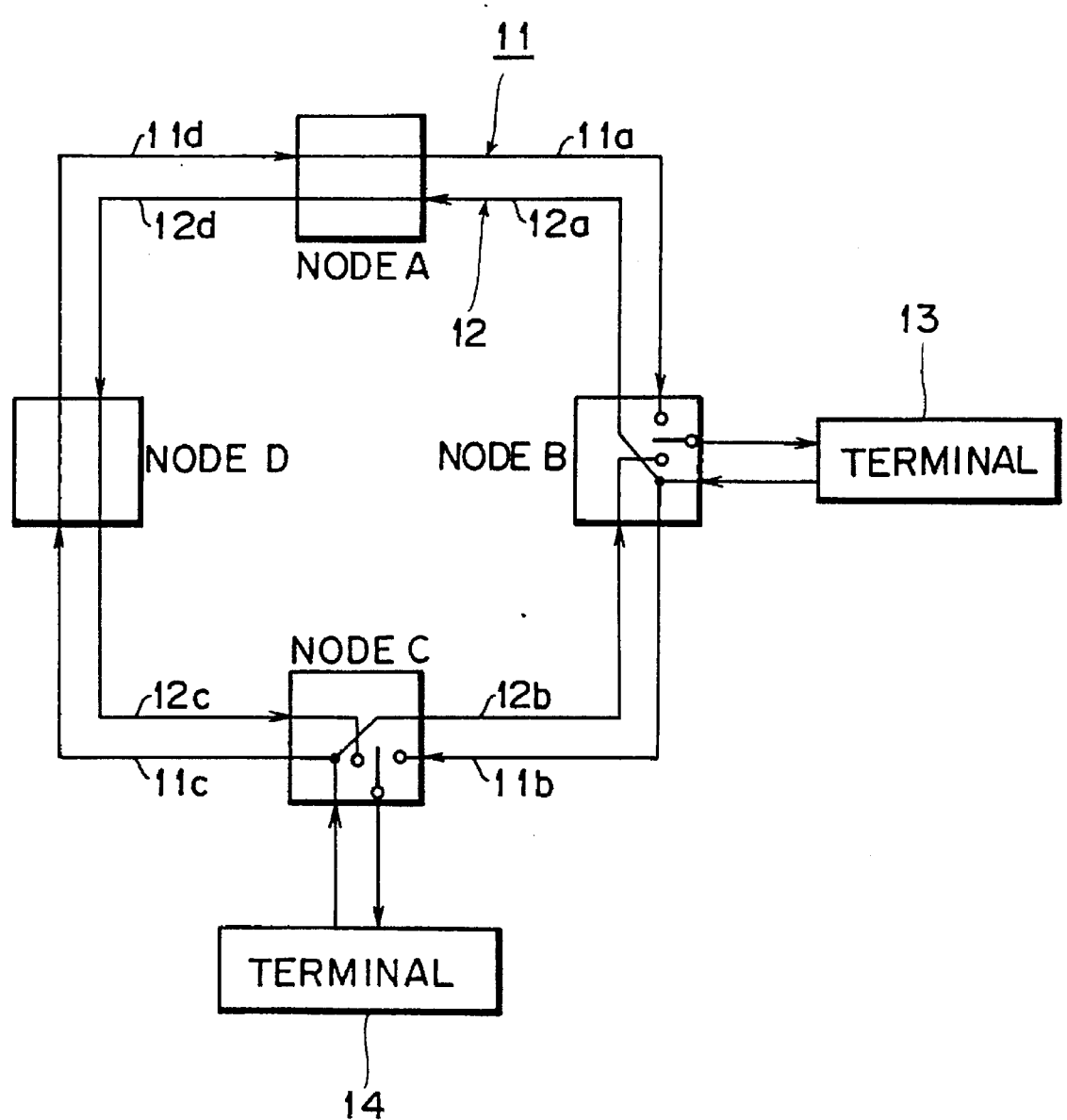
FIG. 3 is a schematic diagram of a ring network structured by connecting a plurality of nodes by a pair of ring transmission lines.

First, referring to FIG. 3, there is shown a ring LAN structured by connecting a plurality of nodes A, B, C, and D by a pair of transmission lines 11 and 12 in a ring form. The nodes B and C are connected with terminals 13 and 14. For convenience of explanation, it is assumed that the nodes A and D are not connected with terminals. Segments of the transmission lines 11 and 12 between nodes are denoted by reference numeral 11a to 11d and 12a to 12d as shown in FIG. 3.

Since each of the nodes A~D is of identical structure, description will be given below on the structure of the node C taken as an example with reference to FIG. 4. The node C includes two transmission line connection processors 16 and 17, a time slot interchanger 18, and a terminal interface 19, and these parts 16 to 19 are connected by drop lines 20 (20a to 20h) and pass lines 21 (21a to 21h).

The drop line 20 means a line which, in an arrangement of a node, such as the node B or C connected with the terminal 13 or 14 as shown in FIG. 3, allows data output from the terminal 13 or 14 to be transmitted over the transmission line or allows incoming data transmitted over the transmission line to be input to the terminal 13 or 14. On the other hand, the pass line 21 means a line which, in an arrangement of a node, such as the node A or D which is not connected by a terminal as shown in FIG. 3, operates only for repeating data.

The transmission line connection processors 16 and 17 determine, in accordance with the state of highway setting, to which highway of the time slot interchanger 18 the data to be transmitted over a highway of the drop line 20 should be assigned, or to which highway of the time slot interchanger 18 the data to be transmitted over a highway of the pass line 21 should be assigned. Namely, in the line setting portion 18, the highway over which a set of data should be transmitted is switched in response to a drop/pass highway setting signal.

The transmission line connection processors 16 and 17 further perform, in response to a terminal/nonterminal setting signal, detection of an alarm in the data input from both directions, i.e., from both the transmission lines 11b and 12c, and blocking of the transmission line from which an alarm has been detected as well as handling of incoming data transmitted over the other transmission line. Namely, when the terminal setting is established, either sets of data incoming from both the directions is selected to be input to the terminal and data delivered from the terminal is transmitted to both the directions. Further, when terminal setting is established, an alarm on account of an abnormality in the transmission line may be detected. When the nonterminal setting is established, data are allowed to pass through the node as they are. The terminal/nonterminal setting can be established for each of the below described handling groups as a unit.

When for example the transmission lines 11 and 12 have a transmission speed of 32 Mbps, the transmission line connection processor 16 or 17 has terminal circuits for 80 handling groups (80 HG). More specifically, incoming data transmitted over transmission lines 11 and 12 are divided into 80 handling groups by time-division demultiplexing. Terminal or nonterminal setting can be established for each handling group. In this case, one handling group has a transmission speed of 64 Kbps×6.

Figure 4:
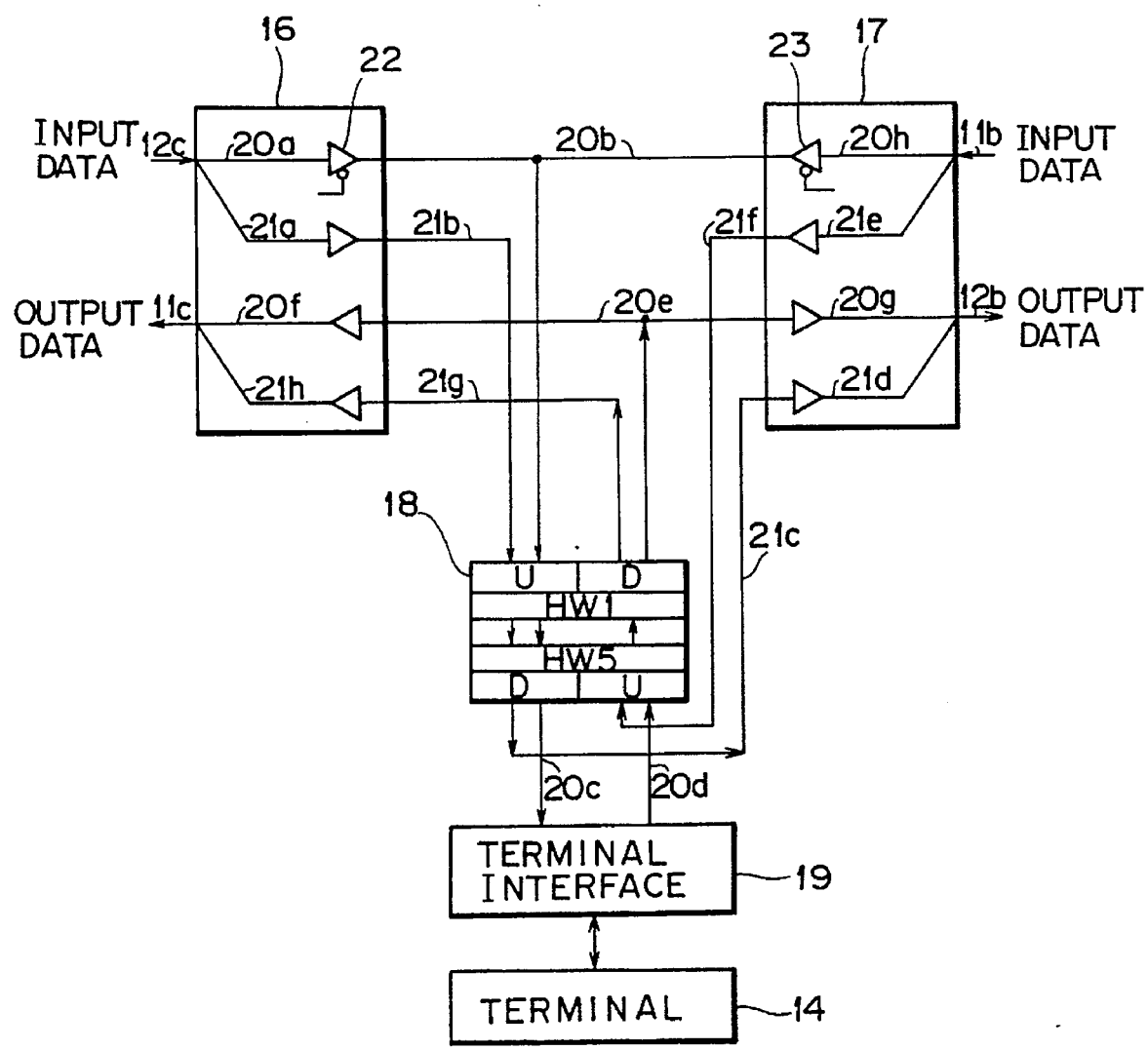
FIG. 4 is a schematic diagram of a node used in the ring network shown in FIG. 3.

Data are output from each of the transmission line connection processors 16 and 17 to a plurality of highways (eight highways in the present embodiment), but, for convenience of explanation, they are represented by the drop line 20 and the pass line 21 in FIG. 4. The time slot interchanger 18 has a plurality of highways HW1 to HW8 and each of the highways HW1 to HW8 has an up portion U serving as an input terminal of data and a down portion D serving as an output terminal of data. In the time slot interchanger 18, highway switching is performed.

Through which of the highways HW1 to HW8 data should be passed is determined in accordance with the terminal/nonterminal setting and the drop/pass highway setting in the transmission line connection processors 16 and 17. Such setting is achieved by having a setting signal input to handling group switches 22 and 23 in the transmission line connection processors 16 and 17. When a terminal setting signal is input to the HG switches 22 and 23, the node C becomes a terminal node, and when a nonterminal setting signal is input thereto, the node C becomes a repeat node.

Since the node C becomes a terminal node when the terminal setting is established, the drop/pass highway setting is made for example to the drop 1. When setting is made to the drop 1, data output from the transmission line connection processor 16 or 17 is input to the up portion U of the highway HW1 of the time slot interchanger 18 through the drop line 20. In the time slot interchanger 18, the highway is switched so that the data is output from the down portion D of the highway HW5. Namely, the combination of the highway HW1 to which data is input and the highway HW5 from which the data is output is determined by the drop 1 signal.

When nonterminal setting is established, the node C becomes a repeat node, and in this case, the output highways are separately set up for the transmission line connection processor 16 and the transmission line connection processor 17. For example, the output highway of the transmission line connection processor 16 is set to the pass 1, while the output highway of the transmission line connection processor 17 is set to the pass 5. When setting is made to the pass 5, data output from the transmission line connection processor 17 is input to the up portion U of the highway HW5 of the time slot interchanger 18 through the pass line 21 and output from the down portion D of the highway HW1.

Operations performed when terminal setting is established in the node C will be described below in detail. As described above, the terminal setting is established when the terminal setting signal is input to the HG switches 22 and 23. For example, if the drop 1 signal is input to the HG switches 22 and 23, the terminal setting is established for the node C.

When setting is made to the drop 1, data input from the transmission line 12c to the transmission line connection processor 16 is input to the up portion U of the designated highways HW1 in the time slot interchanger 18 through the drop line 20a, the HG switch 22, and the drop line 20b and output from the down portion D of the designated highway HW5. The output data is supplied to the terminal 14 through the drop line 20c and the terminal interface 19.

The data output from the terminal 14 is input to the up portion U of the highway HW5 of the time slot interchanger 18 through the terminal interface 19 and the drop line 20d. Then, the data is output from the down portion D of the highway HW1, split in two in the drop line 20e, and simultaneously supplied to the transmission lines 11c and 12b through the drop line 20f and the drop line 20g.

When an alarm has been sent over from the side of the transmission line 12c due to an abnormality produced therein, the alarm is reciprocated between the transmission line connection processors 16 and 17 and, thereupon, a change in setting is made so that data sent over from the side of the normal transmission line 11b may be selected. In this case, the incoming data transmitted over the transmission line 11b is supplied to the terminal 14. Then, even if the transmission line 12c is restored and such a state is brought about where data are transmitted from both transmission lines 11b and 12c, the preceding selecting condition of supplying data to the terminal 14 is maintained. Namely, incoming data through the transmission line 11b are supplied to the terminal 14 as before.

If the node C is a repeat node like the node A or D shown in FIG. 3, the nonterminal setting is made in the transmission line connection processors 16 and 17. For example, a pass 1 signal is input to the HG switch 22 of the transmission line connection processor 16 and a pass 5 signal is input to the HG switch 23 of the transmission line connection processor 17.

When setting is made so, incoming data through the transmission line 12c is input to the up portion U of the designated highway HW1 of the time slot interchanger 18 through the pass lines 21a and 21b and output from the down portion D of the designated highway HW5. The output data is transmitted over the transmission line 12b through the pass lines 21c and 21d. On the other hand, incoming data through the transmission line 11b is input to the up portion U of the highway HW5 of the time slot interchanger 18 through the pass lines 21e and 21f and output from the down portion D of the highway HW1 and, then, transmitted over the transmission line 11c through the pass lines 21g and 21h.

Figure 5:
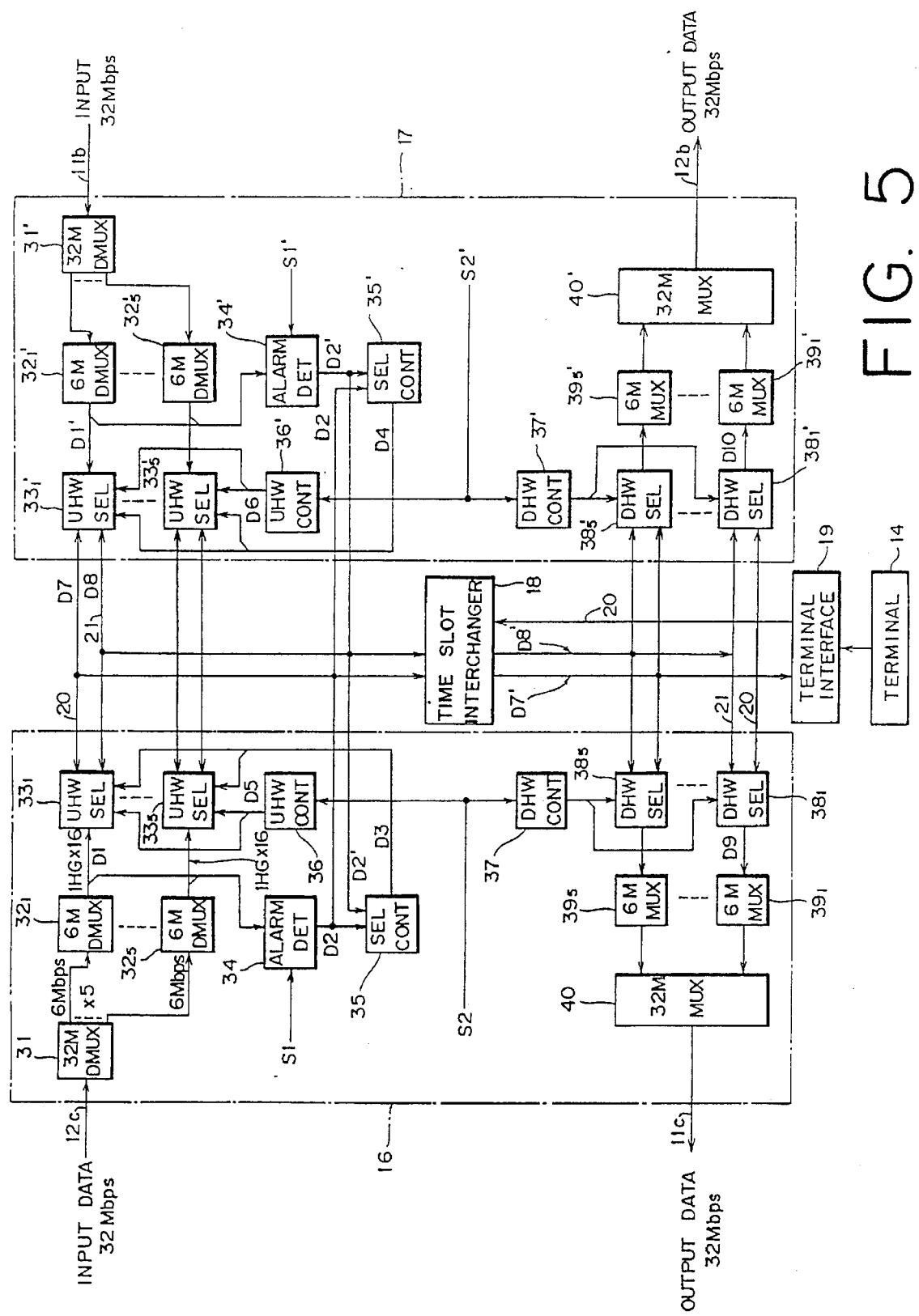
FIG. 5 is a detailed circuit diagram of transmission line connection processing portions in the node shown in FIG. 4.

Referring to FIG. 5 showing particular circuits of the transmission line connection processors 16 and 17 shown in FIG. 4, description of the same will be given below. Parts in FIG. 5 corresponding to those in FIG. 4 are denoted by like reference numerals.

In the transmission line connection processor 16 shown encircled by a chain line, reference numeral 31 denotes a demultiplexer (DMUX), which converts incoming 32 Mbps serial data through the transmission line 12c into 6 Mbps×5 parallel data and outputs the parallel data to DMUX $32_1$ to DMUX $32_5$. Although only two of the DMUX $32_1$ to DMUX $32_5$ are shown in FIG. 4, actually, there are provided five of them. The DMUX $32_1$ to DMUX $32_5$ each convert 6 Mbps serial data into 1 HG×16 parallel data D1 and outputs the parallel data to up highway (UHW) selectors $33_1$ to $33_5$ and an alarm detector 34.

The alarm detector 34, when the terminal/nonterminal setting signal S1 is that instructing to establish the terminal setting, detects whether or not the data D1 output from the DMUX $32_1$ to DMUX $32_5$ is an alarm signal. When the terminal/nonterminal setting signal S1 is that instructing to establish the nonterminal setting, the alarm detector 34 performs no alarm detection. When an alarm signal is detected by the alarm detector 34, an alarm detection signal D2 at "H" level is output to a selection controller 35 and a selection controller 35' of the other transmission line connection processor 17. When no alarm is detected, the alarm detection signal D2 is brought to "L" level.

The selection controller 35, when supplied with the alarm detection signal D2 at "H" level output from the alarm detector 34 and an alarm detection signal D2' at "L" level output from the other alarm detector 34', controls such that no data is output from the UHW selectors $33_1$ to $33_5$. This is achieved by the selection controller 35 outputting a signal D3 at "L". When the signal D3 is at "H", the state in which data is output from the UHW selectors $33_1$ to $33_5$ is brought about.

The UHW selectors $33_1$ to $33_5$ perform such operations as to stop outputting of data in compliance with control executed by the selection controller 35 as described above and to select, in compliance with the control executed by a UHW controller 36, one from among the highways HW1 to HW8 of the time slot interchanger 18 to which the data output from the DMUX $32_1$ to $32_5$ should be delivered from its up portion U, through the drop line 20 or the pass line 21.

The UHW controller 36, in response to a drop/pass HW setting signal S2 such as the drop 1 signal and the pass 1 signal, outputs a signal D5 for controlling the selecting operation of the UHW selectors $33_1$ to $33_5$. The drop/pass HW setting signal S2 is also supplied to a down highway (DHW) controller 37. The DHW controller 37, in response to the drop/pass HW setting signal S2, controls the operation of DHW selectors $38_1$ to $38_5$ to select and output either the data output from the time slot interchanger 18 through the drop line 20 or the data output from the same through the pass line 21.

The DHW selectors $38_1$ to $38_5$, in compliance with the control executed by the DHW controller 37, selects either the data output from the time slot interchanger 18 through the drop line 20 or the data output from the same through the pass line 21 and outputs the selected data to multiplexers (MUX) $39_1$ to $39_5$. The DHW selectors $38_1$ to $38_5$ each output 1 HG×16 parallel data D9.

The multiplexers MUX $39_1$ to $39_5$ convert the parallel data D9 output from the DHW selectors $38_1$ to $38_5$ into 6 Mbps serial data and output them to a MUX 40. Namely, the MUX 40 is supplied with five 6 Mbps serial data in parallel. The MUX 40 converts the parallel data output from the MUX $39_1$ to $39_5$ into 32 Mbps serial data and outputs the serial data to the transmission line 11c.

Since the transmission line connection processor 17 shown on the right side of the diagram has the same structure as the above described transmission line connection processor 16, the parts corresponding to those in the transmission line connection processor 16 are denoted by like reference numerals with a prime and, hence, duplicate explanation of the same will be omitted.

While in the above described node structure, there are followed multiplex steps, a jump type in which data is directly converted between 32 Mbps and 80 HG may also be applicable. There is no limit to the speed of the transmission line, which may be that transmitting 6 Mbps data or that transmitting 400 Mbps data.

The operation of the node shown in FIG. 5 will be described with reference to FIG. 6.

We assume, here, that the transmission line connection processors 16 and 17 are provided with the terminal setting in accordance with terminal/nonterminal setting signals S1 and S1'. As for the drop/pass HW setting of the transmission line connection processors 16 and 17, both the drop/pass HW setting signals S2 and S2' are assumed to be set to the drop 1. More specifically, it is assumed that setting is made such that data output from the UHW selectors $33_1$ to $33_5$ or $33_1'$ to $33_5'$ are input to the up portion U of the highway HW1 of the time slot interchanger 18 and data output from the down portion D of the highway HW5 is selected by the DHW selectors $38_1$ to $38_5$.

The 32 Mbps data input from the transmission line 12c to the transmission line connection processor 16 is first converted into 6 Mbps×5 parallel data by the DMUX 31 and output therefrom. Each of the 6 Mbps data is converted into 1 HG×16 parallel data D1 by the DMUX $32_1$ to $32_5$ and output therefrom.

On the other hand, the 32 Mbps data input from the transmission line 11b to the transmission line connection processor 17 is first converted into 6 Mbps×5 parallel data by the DMUX 31' and output therefrom. Each of the 6 Mbps data is converted into 1 HG×16 parallel data D1' by the DMUX $32_1'$ to $32_5'$ and output therefrom.

Figure 6:
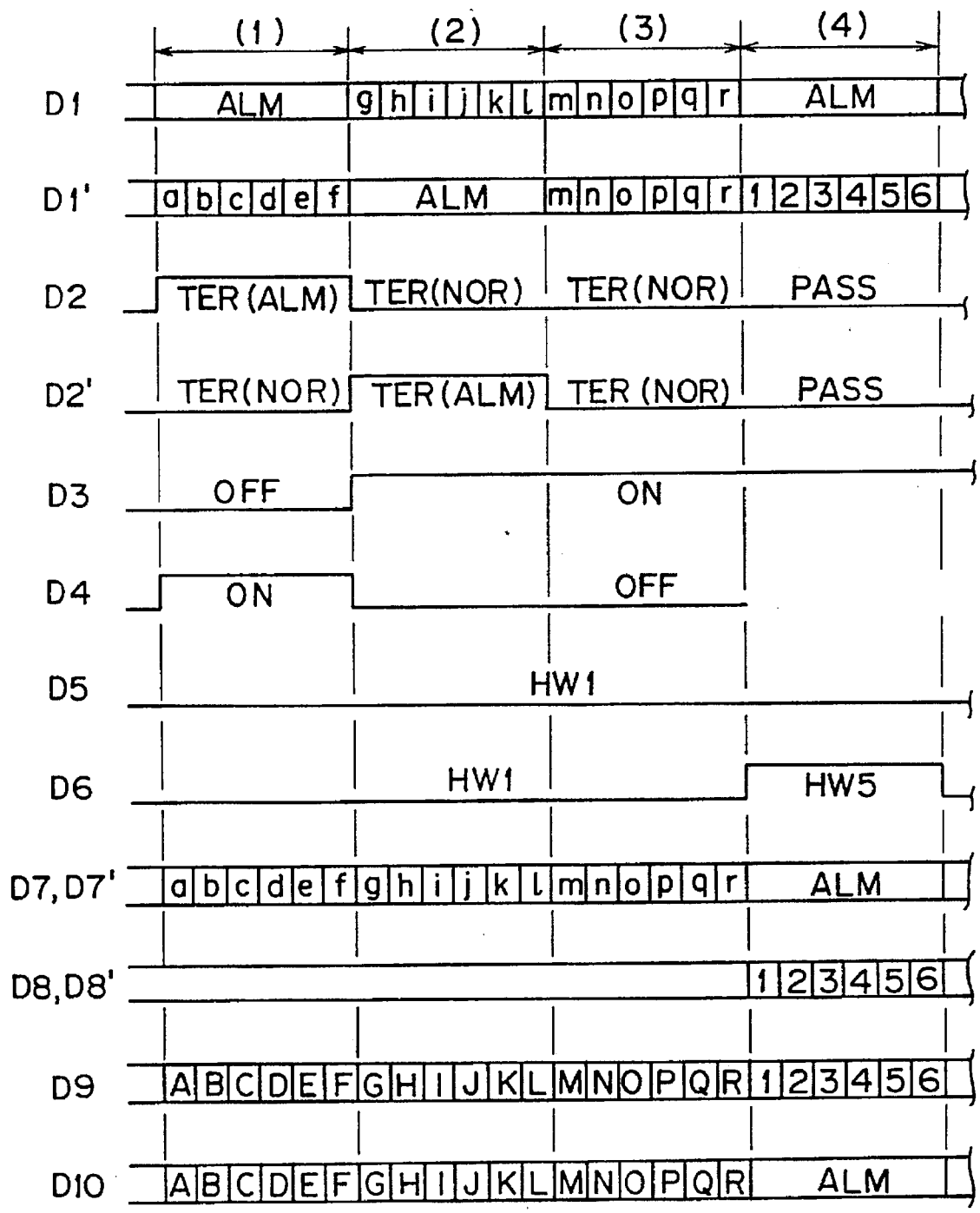
FIG. 6 is a timing chart for explanation of operations in the circuit shown in FIG. 5.

If the parallel data D1 thus output is an alarm signal ALM, while the parallel data D1' is a set of predetermined data "a, b, c, d, e, f", as shown in the column (1) of FIG. 6, the alarm is detected in the alarm detector 34 and, thereby, the alarm detection signal D2 is brought to "H" level. Since no alarm is detected in the alarm detector 34', the alarm detection signal D2' is brought to "L" level. It is to be noted that the data D1 and D1' shown in FIG. 6, in reality, are not in phase as shown in FIG. 6 because of the difference in number of nodes through which they have passed.

When the alarm detection signals D2 and D2' at the above described levels are supplied to the selection controller 35, the control signal D3 from the selection controller 35 becomes "L", and hence the UHW selectors $33_1$ to $33_5$ perform no selecting operation. Namely, no data is output from the UHW selectors $33_1$ to $33_5$. On the other hand, the control signal D4 from the selection controller 35' becomes "H" upon supply thereto of the alarm detection signals D2 and D2' at the above described levels. Hence, the UHW selectors $33_1'$ to $33_5'$ are controlled to perform the selecting operation.

The UHW controller 36', in accordance with the set condition by the above described drop/pass HW setting signal S2', outputs a signal D6 for causing the UHW selectors $33_1'$ to $33_5'$ to input the data D1' to the up portion U of the highway HW1 of the time slot interchanger 18. More specifically, the data D7 "a, b, c, d, e, f" shown in the column (1) of FIG. 6 output from the UHW selectors $33_1'$ to $33_5'$ is input to the up portion U of the highway HW1 of the time slot interchanger 18.

Since the time slot interchanger 18 has the lines arranged such that the data input from the up portion U of the highway HW1 is output from the down portion D of the highway HW5 to the drop line 20, the data D7' "a, b, c, d, e, f" shown in the column (1) of FIG. 6 is output from the down portion D of the highway HW5 to the terminal 14 through the drop line 20 and the terminal interface 19.

On the other hand, the data "A B C D, E, F" delivered from the terminal 14 is input to the up portion U of the highway HW5 of the time slot interchanger 18 through the terminal interface 19 and the drop line 20 and output from the down portion D of the highway HW1 through the drop line 20.

Since, here, the DHW controller 37' under the above set condition, controls the DHW selector $38_1'$ to $38_5'$ to select and output the data output from the time slot interchanger 18 through the drop line 20, the data "A B, C, D, E, F" output from the down portion D of the highway HW1 through the drop line 20 is selected by the DHW selectors $38_1'$ to $38_5'$ and output to the MUX $39_1'$ to $39_5'$. The output data D10 are each converted into serial data in the MUX $39_1'$ to $39_5'$ and the five converted serial data are converted into 32 Mbps serial data in the MUX 40' and transmitted over the transmission line 12b.

Since, the DHW controller 37, like the DHW controller 37' also controls the DHW selectors $38_1$ to $38_5$, the data "A B, C, D, E, F" output from the down portion D of the highway HW1 through the drop line 20 is selected by the DHW selectors $38_1$ to $38_5$ and output to the MUX $39_1$ to $39_5$. The output data D9 are each converted into serial data in the MUX $39_1$ to $39_5$ and the five serial data thus converted are further converted into 32 Mbps serial data in the MUX 40 and transmitted over the transmission line 11c.

We assume, now, that the link on the side of the transmission line 12c has been restored and conversely trouble has occurred in the link on the side of the transmission line 11b. Then, the data D1' becomes alarm data ALM as shown in the column (2) of FIG. 6. When the alarm detector 34' detects the data D1', the alarm detection signal D2' becomes "H". Since a predetermined set of data "g, h, i, j, k, l" is input to the alarm detector 34, alarm detection is not performed and, hence, the alarm detection signal D2 becomes "L".

Since, as a result, the alarm detection signal D2 at "L" and the alarm detection signal D2' at "H" are supplied to the selection controller 35, the control signal D3 becomes "H" so that the UHW selectors $33_1$ to $33_5$ operate to output the data D1 to the drop line 20. Although the alarm detection signal D2 at "L" and the alarm detection signal D2' at "H" are also supplied to the selection controller 35', the control signal D4 becomes "L" this time and, thereby, the UHW selectors $33_1'$ to $33_5'$ are caused to operate not to output the data D1'.

Accordingly, the data D7 "g, h, i, j, k, l" output from the UHW selectors $33_1$ to $33_5$ is input to the up portion U of the highway HW1 of the time slot interchanger 18 through the transmission line 20 and output from the down portion D of the highway HW5. The data D7' "g, h, i, j, k, l" thus output is input to the terminal 14 through the drop line 20 and the terminal interface 19.

We suppose that the link on the side of the transmission line 11b is then restored and data transmitted over both the transmission lines 11b and 12c are input to the transmission line connection processors 16 and 17. At this time, since the data D1 and D1' are the same data "m, n, o, p, q, r" as shown in the column (3) of FIG. 6 and no alarm is detected by both the alarm detectors 34 and 34', the alarm detection signals D2 and D2' both become "L".

Then, the detection signals D2 and D2' at "L" are supplied to the selection controllers 35 and 35'. Since the selection controllers 35 and 35' retain the previous state of the control signals D3 and D4 when both the signals D2 and D2' become "L", the signal D3 is held at "H" and the signal D4 is held at "L". Accordingly, the other operations in this case are the same as in the case of the column (2).

Below will be described operations in the case where the node is a repeat node with reference to the column (4) of FIG. 6. In this case, the terminal/nonterminal setting in the transmission line connection processors 16 and 17 becomes the nonterminal setting.

We now assume that the pass 1 is set up in the transmission line connection processor 16 in response to the drop/pass HW setting signal S2 and, thereby, the data output from the UHW selectors $33_1$ to $33_5$ is adapted to be input to the up portion U of the highway HW1 of the time slot interchanger 18 through the pass line 21 and output from the down portion D of the highway HW5 and, further, in the drop/pass HW setting of the transmission line connection processor 17, the pass 5 is set up and, thereby, the data output from the UHW selectors $33_1'$ to $33_5'$ is adapted to be input to the up portion U of the highway HW5 of the time slot interchanger 18 through the pass line 21 and output from the down portion D of the highway HW1.

Because of the nonterminal setting established in this case, alarm detection by the alarm detectors 34 and 34' is not performed and, therefore, even if the data D1 is that indicating an alarm ALM as shown in the column (4), the alarm detection signal D2 and D2' both become "L". Namely, the UHW selectors $33_1$ to $33_5$ output the data D1 to the pass line 21 and the UHW selectors $33_1'$ to $33_5'$ output the data D1' to the pass line 21. The data D1 thus output is "ALM" shown in the row D7 of the column (4), and the data D1' is "1, 2, 3, 4, 5, 6" shown in the row D8 of the same column.

The data D1 output to the pass line 21 is input to the up portion U of the highway HW1 of the time slot interchanger 18 and output from the down portion D of the highway HW5 through the pass line 21. The data D1' is input to the up portion U of the highway HW5 and output from the down portion D of the highway HW1 through the pass line 21.

Since, at this time, the DHW selectors $38_1'$ to $38_5'$ operate to select data passed through the pass line 21, the data D1 is selected. This data corresponds to "ALM" shown in the row D10 of the column (4). Since, the DHW selectors $38_1$ to $38_5$ also operate to select data on the side of the pass line 21, the data D1' is selected. This data corresponds to "1, 2, 3, 4, 5, 6" shown in the row D9 of the column (4).

Thus, it is understood that the data input from the transmission line 12c is output to the transmission line 12b and the data input from the transmission line 11b is output to the transmission line 11c. As described above, by using the node device according to the present embodiment as a terminal node or a repeat node as shown in FIG. 3, trouble in the transmission lines can be coped with.

Figure 7:
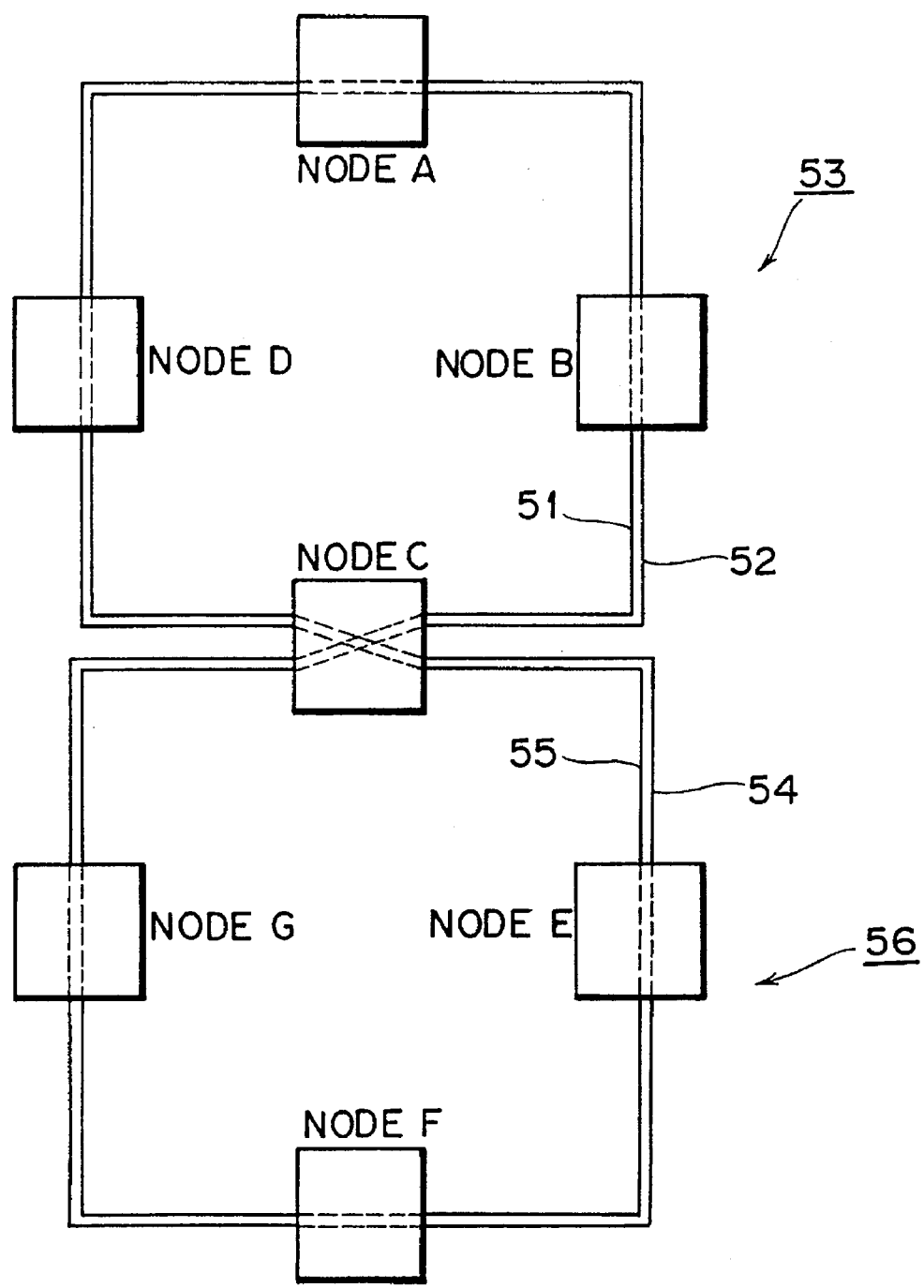
FIG. 7 is a schematic diagram of a multi-ring network according to a first embodiment of the invention structured by connecting two rings having different transmission speeds by a node.

For example, when both the transmission lines 11b and 12b between the node B and the node C are broken, the data sent out from the terminal 14 can be input to the node B through the node C, transmission line 11c, node D, transmission line 11d, node A, and the transmission line 11a and, then, the data can be transmitted from the node B to the terminal 13. Also, in transmitting data from the terminal 13 to the terminal 14, the data sent out from the terminal 13 can be input to the node C through the node B, transmission line 12a, node A, transmission line 12d, node D, and the transmission line 12c and, then, the data can be transmitted from the node C to the terminal 14. In the event of such trouble, it has so far been impossible to maintain the communication Referring to FIG. 7 to FIG. 9, description will be given below of a multi-ring network structured by connecting a plurality of rings having different transmission speeds by the above described node. Referring to FIG. 7, a first ring 53 is formed of node A to node D connected in a ring form by a pair of transmission lines 51 and 52, each thereof having a transmission speed of 32 Mbps. A second ring 56 is formed of node C to node G connected in a ring form by a pair of transmission lines 54 and 55, each thereof having a transmission speed of 6 Mbps. By having the 32 Mbps transmission line 51 and the 6 Mbps transmission line 54 connected with each other by the node C, and having the 32 Mbps transmission line 52 and the 6 Mbps transmission line 55 connected with each other by the same, the multi-ring network is constructed.

Figure 8:
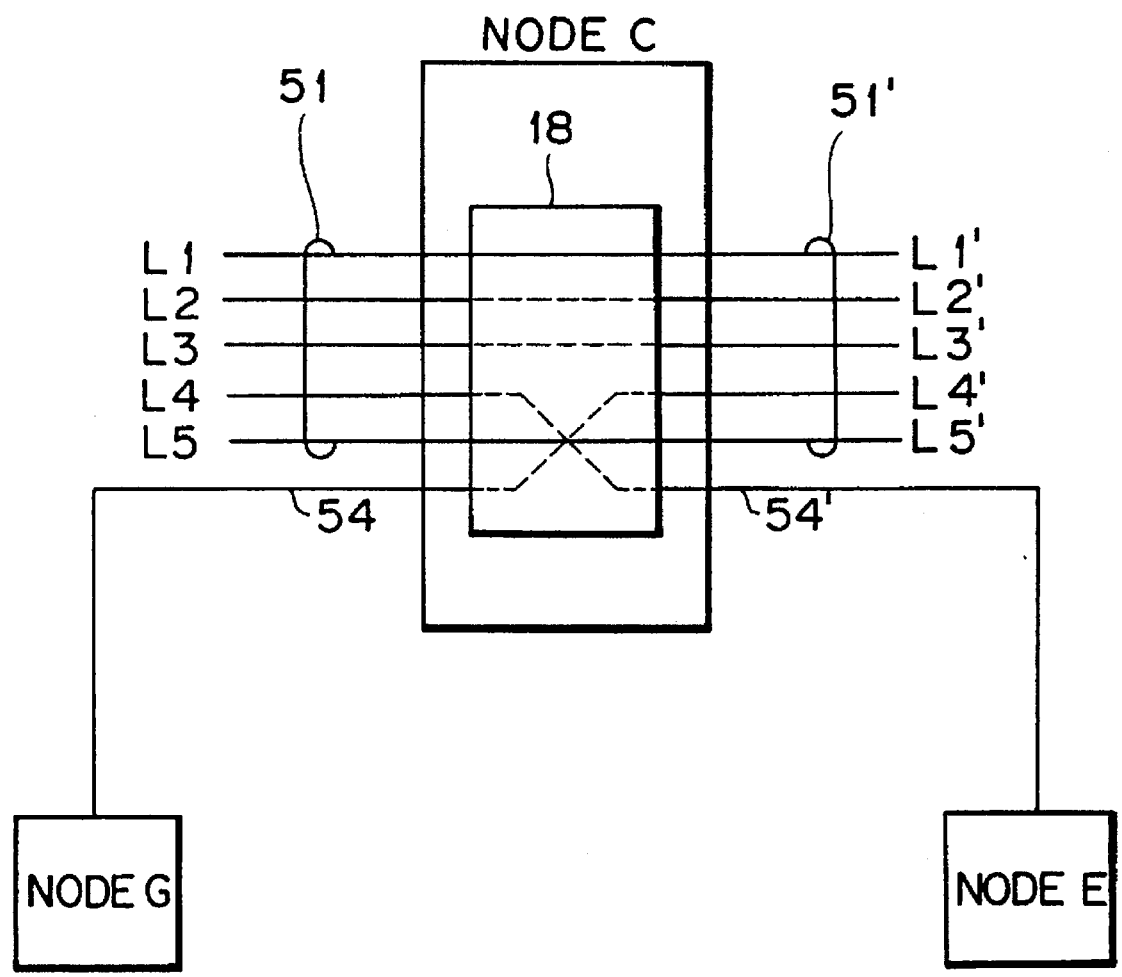
FIG. 8 is a diagram schematically showing connections between the node C shown in FIG. 7 and nodes around the node C.

In connecting the 32 mega (32M) transmission line and the 6 mega (6M) transmission line by the node C, their respective transmission lines are connected together as shown in FIG. 8. In FIG. 8, however, only the connection between the transmission line 51 and the transmission line 54 is shown. In order to distinguish between input side and output side of the node C, a prime is attached to each of the corresponding reference numerals. For convenience of explanation, the 32M transmission lines 51 and 52 will be divided into five 6M lines.

As apparent from FIG. 8, the multi-ring network is structured by connecting an arbitrary 6M line L4 of the 32M transmission line 51 with the 6M transmission line 54 in the time slot interchanger 18. More specifically, the line L4 is connected with the 6M transmission line 54' in the time slot interchanger 18 and the line L4' is connected with the 6M transmission line 54 in the time slot interchanger 18. The lines L1 and L1' and the lines L5 and L5' are connected together to constitute pass lines. Further, the lines L2 and L2', as well as the lines L3 and L3', are set to the terminal mode in the node C and connected to the terminal which is in connection with the node C.

In FIG. 8, for convenience of explanation, the 32M transmission line 51 has been divided into five 6M lines and 6 Mbps transmission lines, both as a unit, are connected with each other. However, in a preferred embodiment of the present invention, the 32 Mbps transmission line is divided into 80 handling groups (80 HG) by time division demultiplexing. Hence, it is made possible to set terminal, to set nonterminal, or to connect the transmission line 51 and the transmission line 54 with each other for each handling group as a unit.

Figure 9:
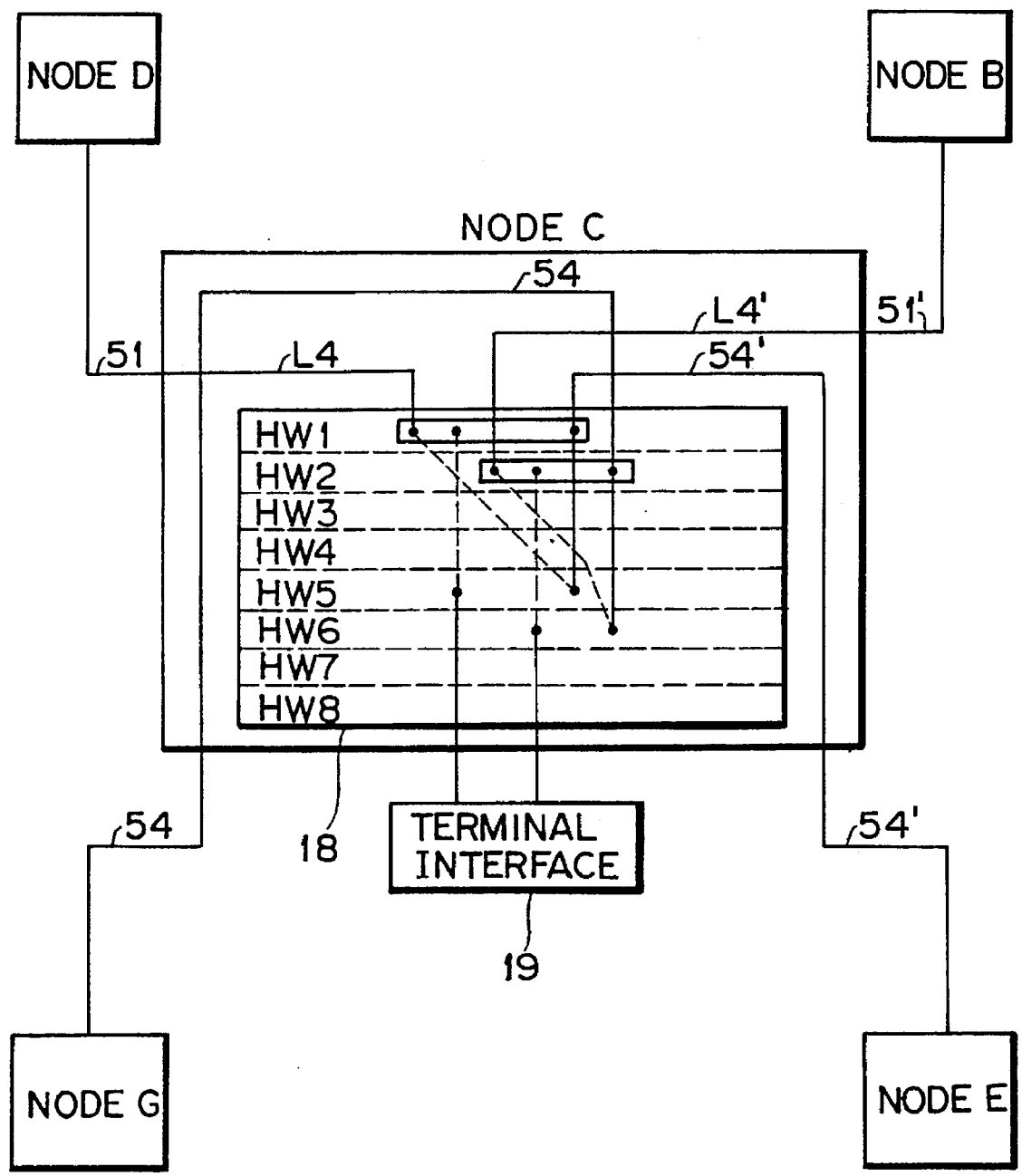
FIG. 9 is a diagram schematically showing a method of connections within the node C shown in FIG. 8.

With reference to FIG. 9, the connection between the 32M transmission line 51 and the 6M transmission line 54 will be described below in more detail. When the node C is a terminal node, the 6M line L4 is set to the drop 1, the 6M line L4' is set to the drop 2, while the 6M transmission line 54 is set to the drop 2 and the 6M transmission line 54' is set to the drop 1.

By so setting, data transmitted over the 6M line L4 of the 32M transmission line 51 connecting the node D to the node C is input to the highway HW1 of the time slot interchanger 18 of the node C and output from the highway HW5 of the time slot interchanger 18 to the terminal interface 19. Further, data transmitted over the 6M line L4' of the 32M transmission line 51' connecting the node B to the node C is input to the highway HW2 of the time slot interchanger 18 of the node C and output from the highway HW6 of the time slot interchanger 18 to the terminal interface 19. Meanwhile, data sent out from the terminal is input to both the highway HW5 and the highway HW6 through the terminal interface 19. The data input to the highway HW5 is output from the highway HW1 to the node D and the node E. The data input to the highway HW6 is output from the highway HW2 to the node B and the node G.

On the other hand, when the node C is set to be a repeat node, the 6M line L4 is set to the pass 1 and the 6M line L4' is set to the pass 2, while the 6M transmission line 54 is set to the pass 6 and the 6M transmission line 54' is set to the pass 5. By so setting, incoming data from the node D through the 6M line L4 is input to the highway HW1 of the time slot interchanger 18 and output from the highway HW5 to the node E. Incoming data from the node B through the 6M line L4' is input to the highway HW2 and output from the highway HW6 to the node G.

The above explanation was made on one of the pairs of transmission lines constituting the double rings. For the other of transmission lines constituting the double rings, setting is made such that data is transmitted in the reverse direction. According to the connecting method of the present embodiment, a multi-ring network can be realized by connecting a plurality of rings having different transmission capacity by a common node. Even if such trouble as breakage of the line is produced in the network, a failure in communication is prevented because data is transmitted in two directions. Further, since a dedicated line is not used for connecting rings, the cost can accordingly be reduced. Conventionally, it has been practiced to connect rings by a dedicated line. Hence, the cost for laying the dedicated line was expensive and when the dedicated line was broken the communication was interrupted.

Figure 10:
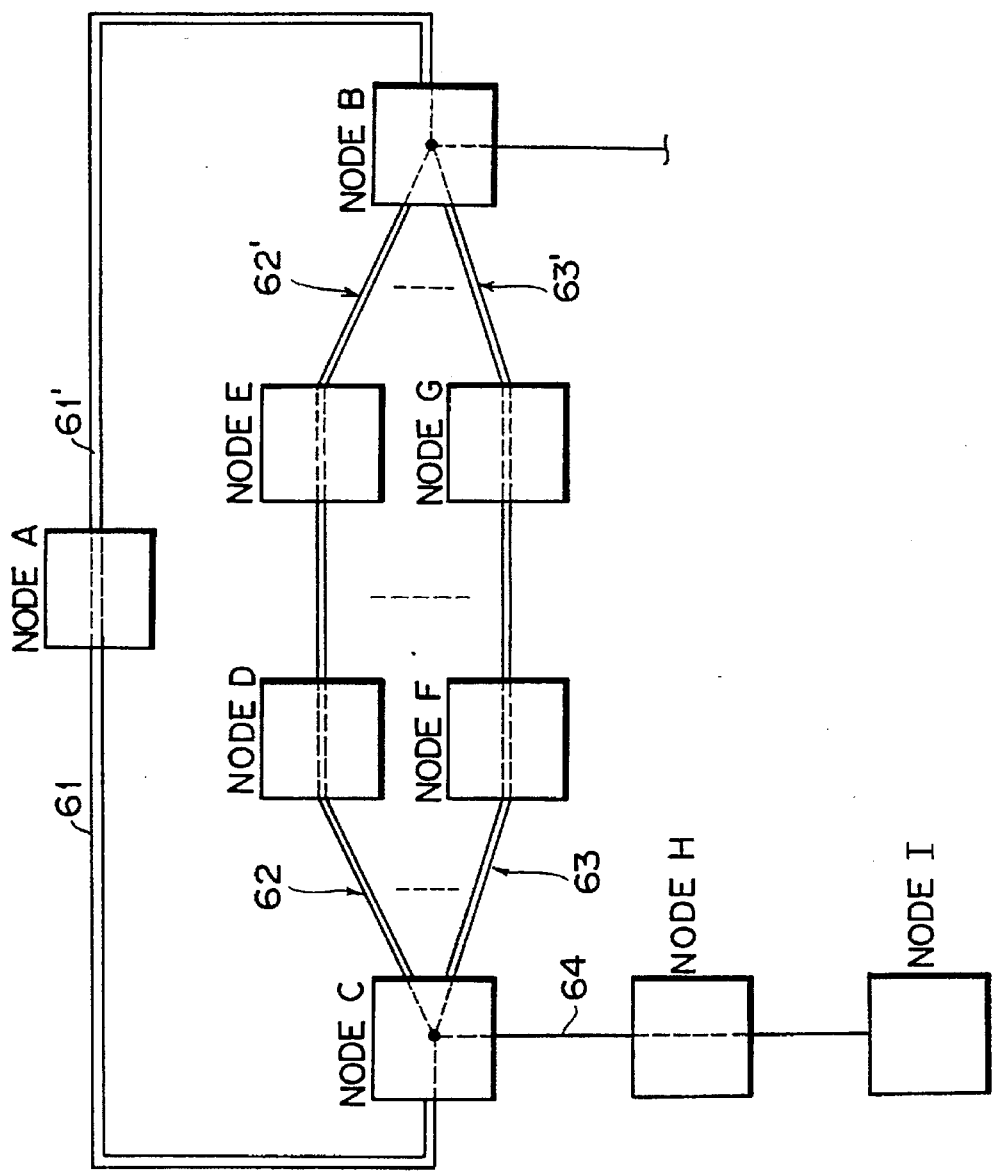
FIG. 10 is a schematic diagram showing a ring network according to a second embodiment of the invention structured by connecting a first and a second duplicative transmission line having different transmission speeds in a ring formed by nodes.

Below will be described another embodiment of a ring network with reference to FIG. 10 to FIG. 12. As shown in FIG. 10, the present network is structured by having a duplicative 32M transmission line 61 connected with five duplicative 6M transmission lines. In FIG. 10, there are shown two 6M transmission lines 62 and 63 with other 6M transmission lines omitted. The node H and the node I are connected with the node C by a 6M transmission line 64.

Figure 11:
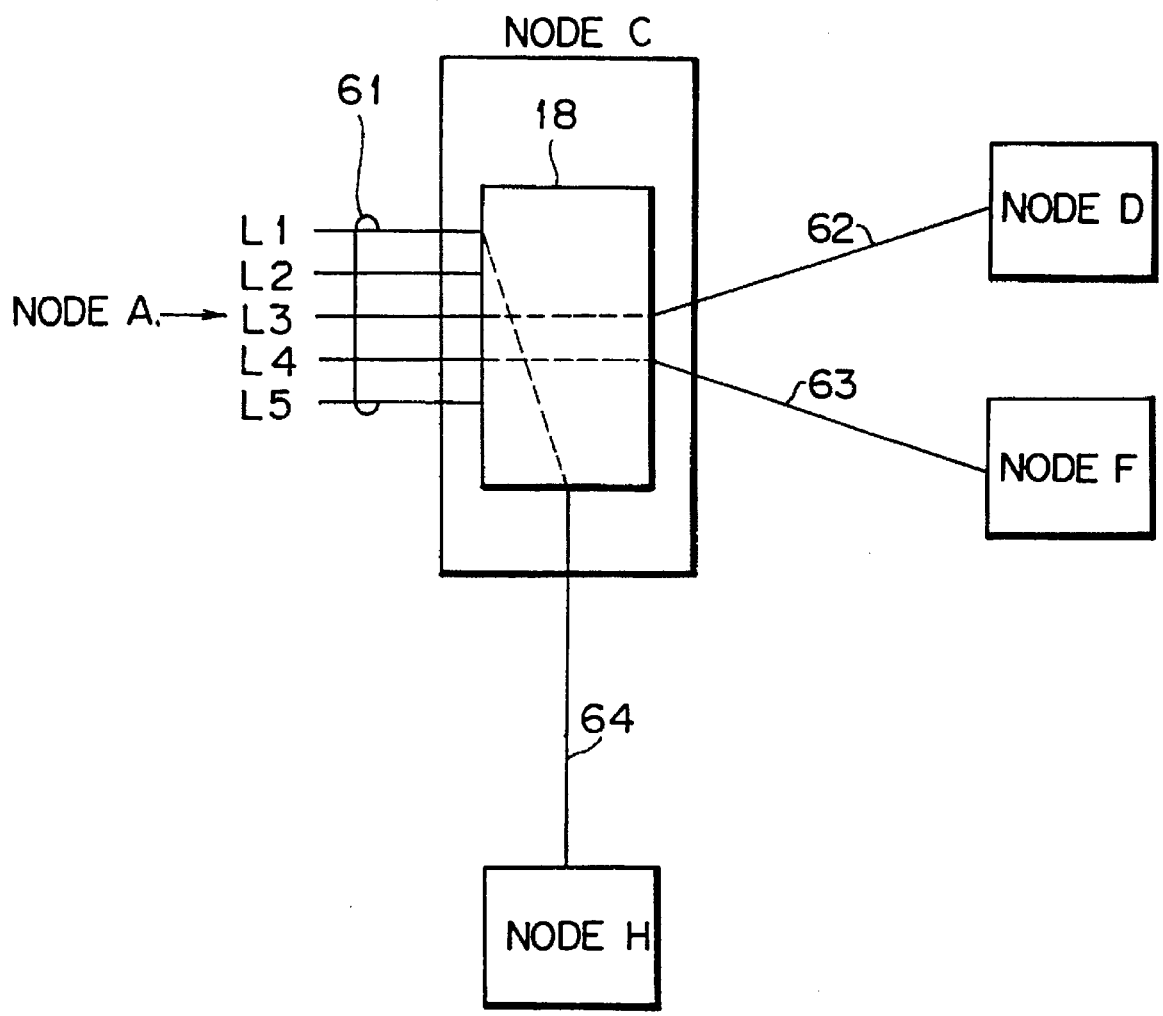
FIG. 11 is a diagram schematically showing a state of connections between the node C shown in FIG. 10 and nodes around the node C.

FIG. 11 shows the state of connections around the node C in the ring network shown in FIG. 10. As apparent from this diagram, the 32M transmission line 61 between the node A and the node C is connected with each of the nodes D, F, and H by the respective 6M transmission lines 62, 63, and 64 in the time slot interchanger 18 of the node C.

Figure 12:
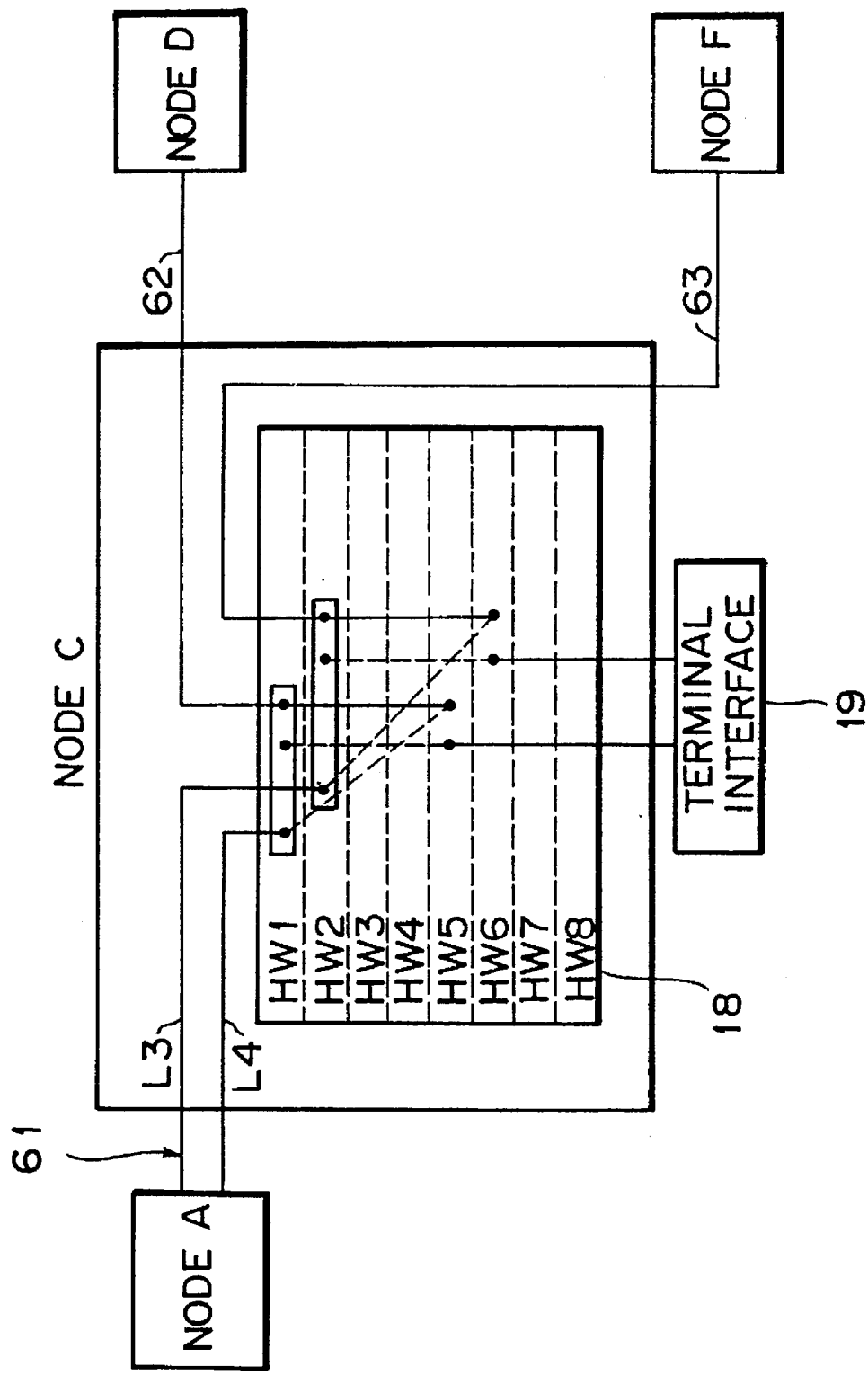
FIG. 12 is a diagram schematically showing a state of connections within the node C shown in FIG. 11.

Referring to FIG. 12, the connections of the 32M transmission line 61 and the 6M transmission lines 62 and 63 achieved in the node C will be described in more detail. When the node C is used as a terminal node, the 6M line L3 of the 32M transmission line 61 is set to the drop 2 and the 6M line L4 is set to the drop 1, while the 6M transmission line 62 is set to the drop 1 and the 6M transmission line 63 is set to the drop 2.

By so setting, data transmitted over the 6M line L4 of the 32M transmission line 61 connecting the node A to the code C is input to the highway HW1 of the time slot interchanger 18 of the node C and output from the highway HW5 to the terminal interface 19. Data transmitted over the 6M line L3 is input to the highway HW2 of the time slot interchanger 18 and output from the highway HW6 to the terminal interface 19. Data transmitted over the 6M transmission line 62 is input to the highway HW1 of the time slot interchanger 18 and output from the highway HW5 to the terminal interface 19. Data transmitted over the 6M transmission line 63 is input to the highway HW2 of the time slot interchanger 18 and output from the highway HW6 to the terminal interface 19.

Meanwhile, data sent out from the terminal is input to the highway HW5 and the highway HW6 of the time slot interchanger 18 through the terminal interface 19. The data input to the highway HW5 is output from the highway HW1 to the 6M line L4 and the 6M transmission line 62. The data input to the highway HW6 is output from the highway HW2 to the 6M line L3 and the 6M transmission line 63.

On the other hand, when the node C is used as a repeat node, the 6M line L3 is set to the pass 2 and the 6M line L4 is set to the pass 1, while the 6M transmission line 62 is set to the pass 5 and the 6M transmission line 63 is set to the pass 6. By so setting, incoming data from the node A through the 6M line L4 is input to the highway HW1 of the time slot interchanger 18 and output from the highway HW5 of the time slot interchanger 18 to the node D through the 6M transmission line 62. Incoming data from the node A through the 6M line L3 is input to the highway HW2 of the time slot interchanger 18 and output from the highway HW6 of the time slot interchanger 18 to the node F through the 6M transmission line 63. Incoming data from the node D through the 6M transmission line 62 is input to the highway HW5 of the time slot interchanger 18 and output from the highway HW1 of the time slot interchanger 18 to the 6M line L4. Incoming data from the node F through the 6M transmission line 63 is input to the highway HW6 of the time slot interchanger 18 and output from the highway FW2 of the time slot interchanger 18 to the 6M line L3. Similar connections are made also in the node B in FIG. 10.

According to the present embodiment, by connecting duplicative transmission lines having different transmission capacity by nodes so as to form a ring, a highly reliable ring network can be structured. Since data can be transmitted in two directions, interrupted communication does not occur even if trouble such as a breakage of a transmission line occurs.

What is claimed is:

1. A multi-ring network comprising:

a first ring structured by connecting a plurality of first nodes by a pair of ring-formed first transmission lines, said pair of first transmission lines each having a first transmission speed;

a second ring structured by connecting a plurality of second nodes by a pair of ring-formed second transmission lines, said pair of second transmission lines each having a second transmission speed lower than the first transmission speed; and a single third node for connecting a first one of the transmission lines of said pair of first transmission lines of said first ring with a first one of the transmission lines of said pair of second transmission lines of said second ring and for connecting the other transmission line of said pair of first transmission lines with the other transmission line of said pair of second transmission lines;

wherein said third node comprises:

a demultiplexer for deriving a plurality of first handling group data by time division demultiplexing first data transmitted over said first pair of transmission lines and having the first transmission speed;

first means for converting second data transmitted over said pair of second transmission lines and having the second transmission speed into second handling group data with the same speed as that of said first handling group data;

alarm information detection means for detecting alarm information which is part of a data stream transmitted from both directions through said pair of first transmission lines and said pair of second transmission lines;

switch means for cutting off a transmission line from which the alarm information has been sent over and outputting incoming data from the other transmission line to a terminal connected to said node;

a plurality of highways adapted to transmit the first and second handling group data;

a multiplexer for time division multiplexing the first and the second handling group data and outputting the multiplex data to said first pair of transmission lines;

means for selecting highways for transmitting the first and second handling group data from among said plurality of highways, said means for selecting highways including transmission line connection processors which switch in response to a drop/pass highway setting signal;

highway switch means for switching the first and second handling group data transmitted over said selected highways to other highways; and second means for converting the first handling group data for speed and outputting the data converted for speed to said second transmission line.

2. A multi-ring network comprising:

a first ring structured by connecting a plurality of first nodes by a pair of ring-formed first transmission lines, said pair of first transmission lines having a first transmission speed;

a second ring structured by connecting a plurality of second nodes by a pair of ring-formed second transmission lines, said pair of second transmission lines having a second transmission speed lower than the first transmission speed; and a single third node for connecting a first one of the transmission lines of said pair of first transmission lines of said first ring with a first one of the transmission lines of said pair of second transmission lines of said second ring; and for connecting the other transmission line of said pair of first transmission lines with the other transmission line of said pair of second transmission lines;

wherein said third node comprises a demultiplexer for deriving a plurality of first handling group data by time division demultiplexing first data transmitted over said pair of first transmission lines and having the first transmission speed;

first means for converting second data transmitted over said pair of second transmission lines and having the second transmission speed into second handling group data with the same speed as that of said first handling group data;

a plurality of highways adapted to transmit the first and second handling group data;

means for selecting highways for transmitting the first and second handling group data from among said plurality of highways, said means for selecting highways including transmission line connection processors which switch in response to a drop/pass highway setting signal;

a multiplexer for time division multiplexing the first and the second handling group data and outputting the multiplex data to said pair of first transmission lines;

means for selecting first handling group data to be assigned to said pair of second transmission lines;

second means for converting the selected first handling group data for speed and outputting the data converted for speed to said pair of second transmission lines; and connection means for connecting the selected first handling group data to said second means and connecting said second handling group data to said multiplexer;

wherein at least one of said first, second, and third nodes further comprises:

terminal mode means including means for transmitting data delivered from a terminal connected to said node in both directions of said pair of first transmission lines and said pair of second transmission lines, each line of said pairs of transmission lines passing data in opposite directions within a corresponding ring, and means for selecting one of data transmitted from both the directions and outputting the selected data to said terminal, said terminal mode means further including alarm information detection means for detecting alarm information which is part of a dam stream transmitted from both the directions through said pairs of transmission lines, and switch means for cutting off a transmission line from which the alarm information has been sent over and outputting incoming data from the other transmission line to said terminal;

repeat mode means for allowing incoming data transmitted from both the directions to pass through said node in their transmitted directions; and mode selection means for selecting either of said terminal mode means or said repeat mode means for each handling group data as a unit for said first, second, and third nodes.

3. A ring network comprising:

a first duplicative transmission line structured by connecting a plurality of first nodes by a pair of first transmission lines, said first pair of transmission lines each having a first transmission speed;

a plurality of second duplicative transmission lines each thereof being structured by connecting a plurality of second nodes by a pair of second transmission lines, said pair of second transmission lines each having a second transmission speed lower than the first transmission speed; and a pair of third nodes connecting a first one of the transmission lines of said pair of first transmission lines of said first duplicative transmission lines with a first one of the transmission lines of said pair of second transmission lines of said plurality of second duplicative transmission lines and for connecting the other transmission line of said pair of first transmission lines with the other transmission line of said pair of second transmission lines of said plurality of second duplicative transmission lines in a ring form;

wherein said third nodes each comprises:

a demultiplexer for deriving a plurality of first handling group data by time division demultiplexing first data transmitted over said first duplicative transmission line and having the first transmission speed;

a plurality of first conversion means for converting second data transmitted over said second duplicative transmission lines and having the second transmission speed into second handling group data with the same speed as that of said first handling group data;

a plurality of highways adapted to transmit the first and second handling group data;

means for selecting highways for transmitting the first and second handling group data from among said plurality of highways, said means for selecting highways including transmission line connection processors which switch in response to a drop/pass highway setting signal;

a multiplexer for time division multiplexing the second handling group data and outputting the multiplex data to said first duplicative transmission line;

means for selecting first handling group data to be assigned to said respective second duplicative transmission lines;

a plurality of second conversion means for converting the first handling group data for speed and outputting the data converted for speed to each of said second duplicative transmission lines; and connection means for connecting the first handling group data to said respective second conversion means and connecting said second handling group data to said multiplexer;

wherein each of said first, second, and third nodes comprises:

terminal mode means including means for transmitting data delivered from the terminal connected to said node in both directions through said first duplicative transmission line and said second duplicative transmission lines, each line of the said first and second duplicative transmission lines passing transmission in opposite directions within a corresponding ring, and means for selecting one of data transmitted from both the directions and outputting the selected data to said terminal, said terminal mode means further including alarm information detection means for detecting alarm information which is part of a data stream transmitted from both the directions through said pairs of transmission lines, and switch means for cutting off a transmission line from which the alarm information has been sent over and outputting incoming data from the other transmission line to said terminal;

repeat mode means for allowing incoming data transmitted from both the directions to pass through said node in their transmitted directions; and mode selection means for selecting either of said terminal mode means or said repeat mode means for each handling group data as a unit for said first, second, and third nodes.

4. A multi-ring network according to claim 1, wherein each of said plurality of highways has an up portion serving as an input terminal of data and a down portion serving as an output terminal of data, and wherein said means for selecting highways switch in accordance with a terminal/non-terminal setting signal input to said transmission line connection processors.

* * * * *

UNITED STATES PATENT AND TRADEMARK OFFICE
CERTIFICATE OF CORRECTION

PATENT NO. : 5,661,720
DATED : Aug. 26, 1997
INVENTOR(S) : Takayuki Taniguchi

It is certified that error appears in the above-indentified patent and that said Letters Patent is hereby corrected as shown below:

Column 2, line 16, delete "includes:" and insert -- includes-- therefor.

Column 6, line 51, delete "1" and insert --1-- therefor.

Column 7, line 32, delete "1" and insert --1-- therefor.

UNITED STATES PATENT AND TRADEMARK OFFICE
CERTIFICATE OF CORRECTION

PATENT NO. : 5,661,720
DATED : Aug. 26, 1997
INVENTOR(S) : Takayuki Taniguchi

It is certified that error appears in the above-indentified patent and that said Letters Patent is hereby corrected as shown below:

Column 8, line 51, delete "A B C D, E, F" and insert --A, B, C, D, E, F-- therefor.

Column 8, line 57, delete "37'" and insert --37',-- therefor.

Column 8, line 60, delete "A B, C, D, E, F" and insert --A, B, C, D, E, F-- therefor.

Column 9, line 2, delete "A" and insert --A,-- therefor.

Column 13, line 5, delete "FW2" and insert --HW2-- therefor.

UNITED STATES PATENT AND TRADEMARK OFFICE
CERTIFICATE OF CORRECTION

PATENT NO. : 5,661,720
DATED : Aug. 26, 1997
INVENTOR(S) : Takayuki Taniguchi

It is certified that error appears in the above-identified patent and that said Letters Patent is hereby corrected as shown below:

Column 14, line 65, delete "dam" and insert --data-- therefor.

Signed and Sealed this

Eighteenth Day of August, 1998

Attest:

BRUCE LEHMAN

Attesting Officer          Commissioner of Patents and Trademarks